R. FITZ POWER.
MODEL ARTILLERY RANGE FOR INSTRUCTIONAL PURPOSES.
APPLICATION FILED AUG. 15, 1917.
1,296,426.
Patented Mar. 4, 1919.
5 SHEETS—SHEET 1.
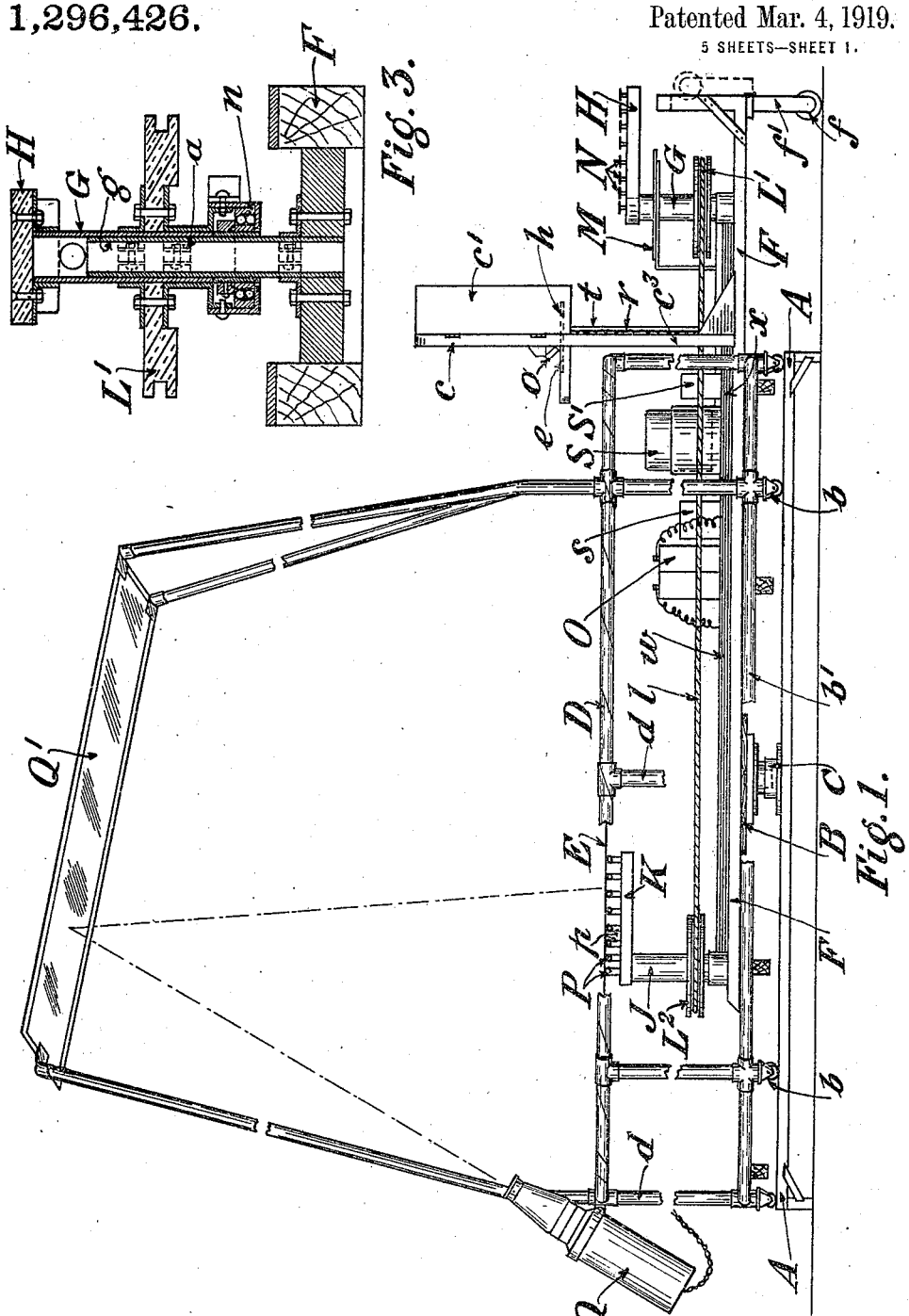

R. FITZ POWER.
MODEL ARTILLERY RANGE FOR INSTRUCTIONAL PURPOSES.
APPLICATION FILED AUG. 15, 1917.
1,296,426.
Patented Mar. 4, 1919.
5 SHEETS—SHEET 2.
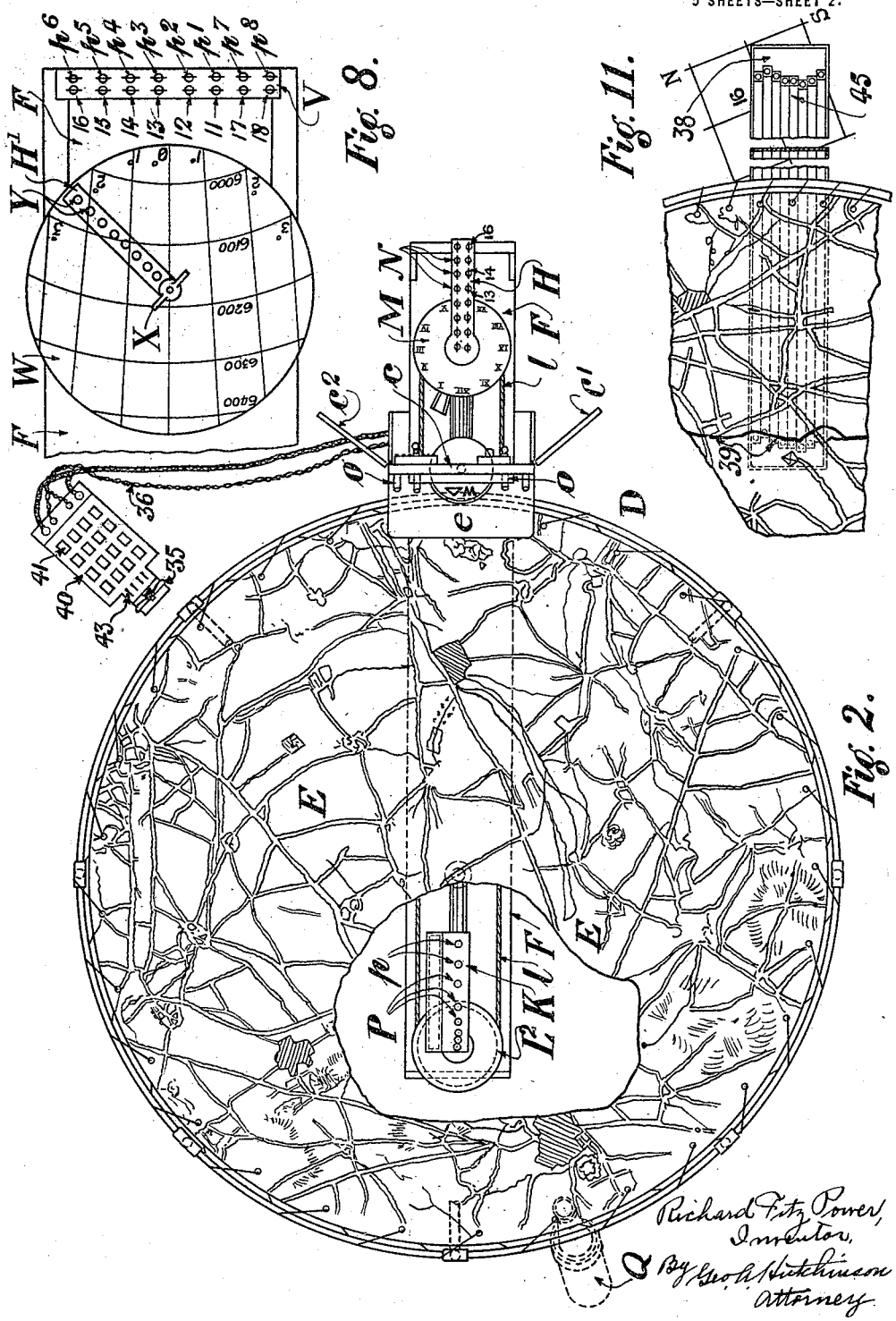

R. FITZ POWER.
MODEL ARTILLERY RANGE FOR INSTRUCTIONAL PURPOSES.
APPLICATION FILED AUG. 15, 1917.

1,296,426.

Patented Mar. 4, 1919.
5 SHEETS—SHEET 3.

Richard Fitz Power,
Inventor
By Geo. A. Hutchinson
Attorney

R. FITZ POWER.
MODEL ARTILLERY RANGE FOR INSTRUCTIONAL PURPOSES.
APPLICATION FILED AUG. 15, 1917.
1,296,426.
Patented Mar. 4, 1919.
5 SHEETS—SHEET 4.
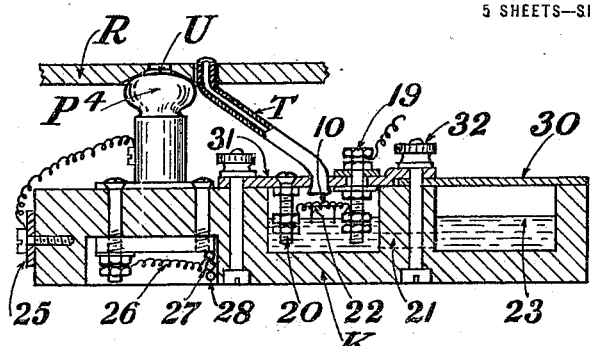
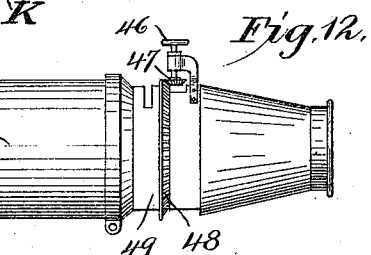
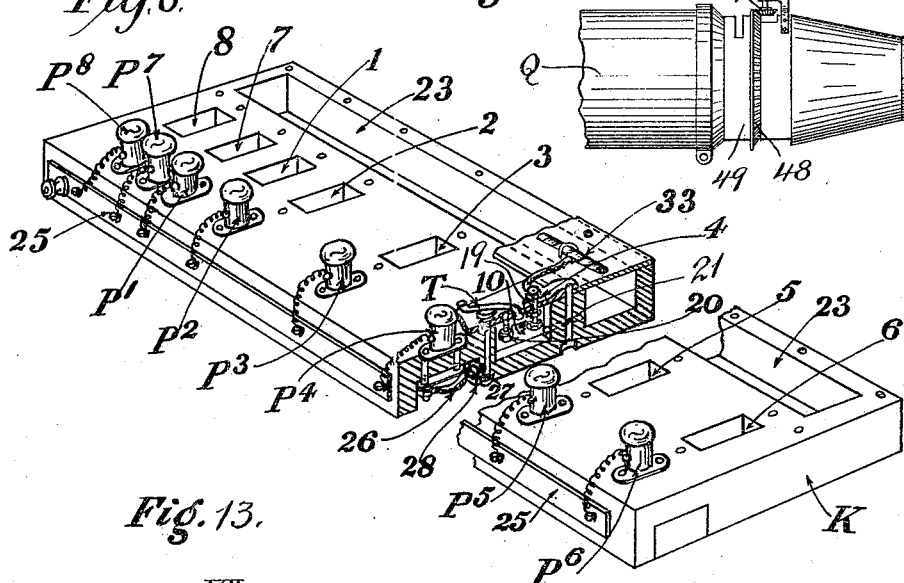
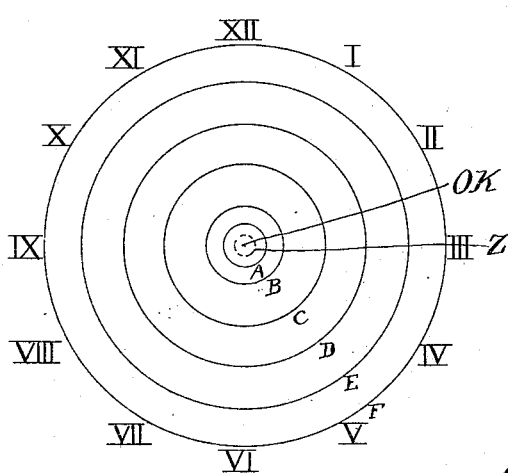
Richard Fitz Power,
Inventor,
By Geo. A. Hutchinson,
Attorney.

R. FITZ POWER.
MODEL ARTILLERY RANGE FOR INSTRUCTIONAL PURPOSES.
APPLICATION FILED AUG. 15, 1917.

1,296,426.

Patented Mar. 4, 1919.
5 SHEETS—SHEET 5.

UNITED STATES PATENT OFFICE.

RICHARD FITZ POWER, OF DOVERIDGE, ENGLAND.

MODEL ARTILLERY-RANGE FOR INSTRUCTIONAL PURPOSES.

1,296,426. Specification of Letters Patent. Patented Mar. 4, 1919.

Application filed August 15, 1917. Serial No. 186,432.

*To all whom it may concern:*

Be it known that I, RICHARD FITZ POWER, a subject of the King of Great Britain, residing at Doveridge, in the county of Derby, England, have invented certain new and useful Improvements in Model Artillery-Ranges for Instructional Purposes, of which the following is a specification.

This invention relates to an improved method and apparatus for instructing observers in aerial craft in the art of aerial artillery observation.

It is usual at the present time to provide a raised model of a part of the line preferably under cover, and made of earth or clay with roads and streams marked by means of tape; houses and woods being also marked in a suitable manner, and so on; and trenches are usually indicated by lines scratched in the earth. The observer is usually seated on a ladder overlooking the model, and equipped with a Morse "buzzer", or other means of sending down Morse signals to represent the wireless set used in aerial practice on an aeroplane during observation. The bursts of shell are represented either by a small white sphere fixed to the end of a wand wielded by the instructor, or a small tuft of cotton wool, or a small electric light globe capable of being switched on or off may be fixed on the wand, which is dropped lightly and allowed to rest for an instant on the place where the shell is supposed to have burst. Alternatively, the bursts are represented around definite fixed targets by a number of small electric globes which are lightly buried in the earth forming the model; they are wired up underneath the table and operated by means of a switchboard under the control of the instructor.

The disadvantages of the first scheme are that the observer can see where the wand is about to fall, and of the second scheme, that after a very few lessons any observer learns all the possible bursts to any one target in a very short time; the greatest drawback, however, in both systems is the lack of any near approach to an accurate representation of the real thing, wherein the shell-burst is seen as a momentary flash followed by a puff of smoke which, naturally, expands by a diffusion, and eventually disperses.

The object of this invention is to obviate the difficulties mentioned, and to provide a more accurate representation of the conditions in actual practice.

This object is attained by the mechanism illustrated in the accompanying drawings, in which:—

Figure 1 is a side elevation of the apparatus;

Fig. 2 is a plan of Fig. 1;

Fig. 3 is an enlarged view showing the support for the operating arm;

Fig. 6 is a perspective view showing the shell-burst arm of Fig. 5 in detail;

Fig. 7 is a section of the shell-burst arm, showing the connection with its table;

Fig. 8 shows the arrangement of the operating arm for gunnery instruction;

Figure 4:
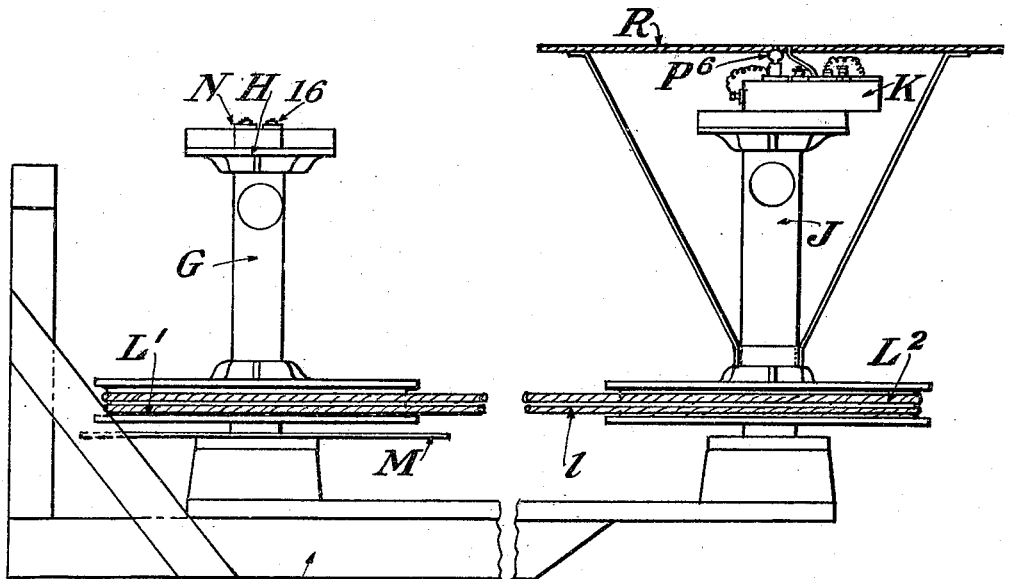
Figs. 4 and 5 are a side view and a plan respectively of the end parts of the base board showing an alternative method of producing the smoke puffs.

Fig. 11 indicates diagrammatically a contact patrol base board which is a special base board used for teaching the pupil how to signal the position of a number of contiguous points;

Fig. 12 shows a device for rotating the slide in the lantern; and

Fig. 13 is a diagram illustrating the clock code as used by aviators and gunners.

Similar letters refer to similar parts throughout the several views.

Referring first to Figs. 1, 2 and 3, which show the apparatus when using a smoke reservoir, A is a low table, or platform, resting on the ground. B is a board pivoted about a pivot C attached to the board A and carried by the bowls *b* so that it will rotate about the pivot C. On the top of the board B constructed with the frame *b'*, a framework D is carried by means of the struts *d*, and on the frame D is stretched a canvas sheet E of somewhat coarse mesh, the sheet being colored as the surface of the ground to resemble as nearly as possible the existing natural features of the locality where the model range is being used.

Between the canvas covering E and the revolving board B is a space into which is passed the base board F so that it can move about therein freely. At one end of the base board F a hollow pillar G is supported by an inside tube g, the pillar G being surmounted by an operating arm or bar H; similarly, at the other end of the board F a second pillar J is mounted on a second inner tube and is surmounted by the shell-burst arm K. Pulleys L¹, L², are attached to the pillars G and J respectively, and are connected by a cable l; consequently, when the operating arm H is rotated, the shell-burst arm K also rotates in similar phase. Further, a clock face M is provided, which is supported in a stationary but adjustable manner, with its center concentric with the center of rotation of the arm H.

Conveniently, the pulleys L¹, L², will be attached to the pillar G by plates such as a bolted around the said pillar, and a ball bearing n is provided to reduce the friction of rotation between the outer pillar G and the fixed pillar g, the pillar g also being attached to the base board F by plate clips, as shown in Fig. 3.

Constructed on the arm H are a number of electrical switches N, and connecting wires pass from these switches to the battery O and thence onward and up through the arm J to a series of electric lamps P carried by the arm K; each of these lamps is sheltered within a separate cylinder p, which cylinders pass upward from the arm and terminate just beneath the canvas sheet E. S is a smoke reservoir in which smoke is produced under pressure by a smoke generating apparatus s; S' is a pressure chamber for imparting additional pressure to the smoke, and a tube, or tubes, connect the tap switches N with this chamber S' and also, after passing the tap switch by means of a separate tube, with each cylinder p of the smoke burst arm K, the switches N being in the form of taps in the said tubes which first make an electrical connection by the partial movement of the tap handle, with the electric lamp P with which the particular tap is connected, and immediately thereafter opens the tube so that smoke can pass from the smoke pressure chamber S' to the particular cylinder p which contains the lamp that has been illuminated by the tap switch N that has been turned.

The base board F is loose, and can be moved so that the shell-burst arm K is beneath any portion of the canvas E, and in operation this shell-burst arm K is moved to some particular point beneath the canvas E at which the instructor wishes to show a shell-burst. He can then bring the arm beneath any particular point in the locality by rotating the operating arm H, and, having found the particular point he wishes, by turning the correct tap N he will illuminate the corresponding lamp P on the arm K, and will immediately thereafter release a puff of smoke from its containing cylinder p, thus illustrating more correctly the flash and smoke of a shell-burst in actual practice, and which disappears in much the same time as the actual shell-burst. It is usual for an aviator observing from an aeroplane and having a wireless communication set to transmit his observations by reference to the face of a clock; and by providing the clock face M beneath the operating arm H, the instructor knows precisely what the observer's observations should be in clock code language. To prevent the base board overbalancing when the shell-burst arm is near the edge of the canvas, it may be made telescopic, extra pulleys being provided which allow of this while the belt remains of the same length. Alternatively, a caster, such as f on a hinged fork f', may be used to support the end of F.

In operation, when selecting any particular target, the base board is moved about with the instructor's finger continually on the "O K" flash lamp switch; i. e., the end switch N on the arm H for the lamp P at the center of rotation of the arm K, and representing the target position, usually signaled in the British services as the "O K," or correct range when the gun is reaching its target; when the above mentioned light is brought to rest beneath the target, the instructor knows that the base board is in correct position for engaging that particular target.

Figs. 4 to 7 show a modification of the shell-burst arm for producing the smoke puffs by electricity, and this is a preferred form of the apparatus; the parts other than the base board F are the same, and the arm supports G, J, and the pulleys L¹, L², (Fig. 4) on the base board are also the same; the shell-burst arm K is, however, a fiber or brass block, and is provided in this case with a series of wells 1, 2, 3, 4, 5, 6, corresponding to the standard circles A, B, C, D, E, F of the clock code indicator, 8 representing the target or "O K" point above the center of revolution, and 7 being an intermediate point corresponding to Z in the standard clock code between A and "O K." The distance between the lamps P², P³, P⁴, etc., will be to a known scale, normally the scale of the map with which the apparatus is used, say, 1 to 1,800.

The clock code lettering is not shown in order not to confuse the drawings and as it is always known by British observers, but in order that others shall understand the description an ordinary diagram of the clock code is shown in Fig. 13 with its usual lettering (except that O K and circle Z are not usually marked).

Figure 5:
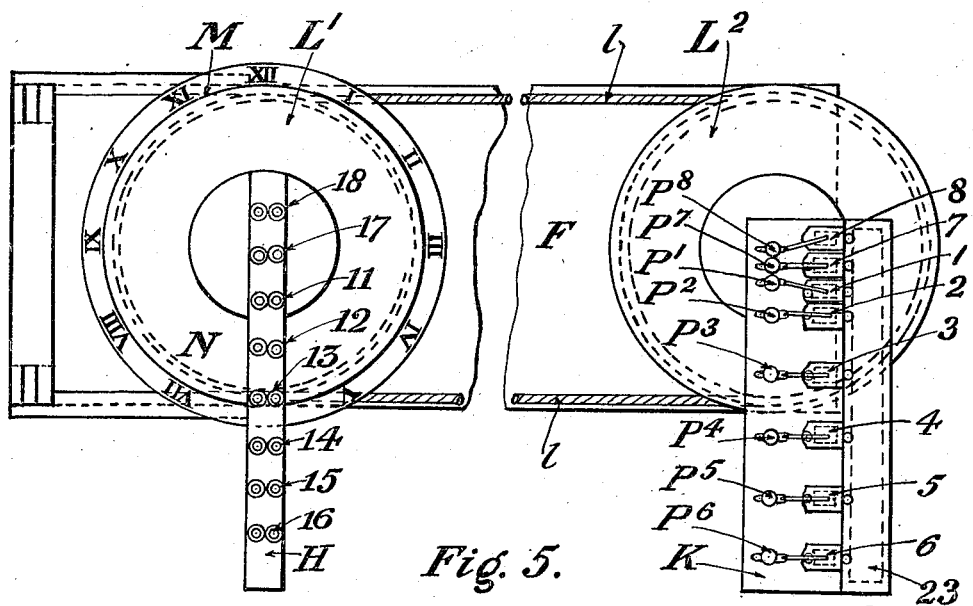
Figure 9:
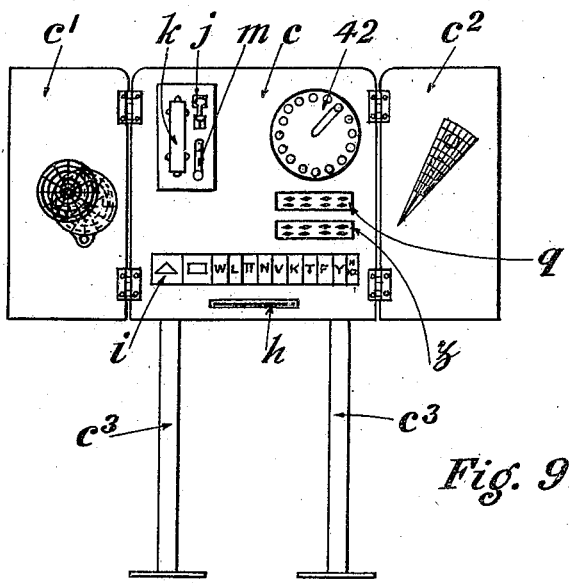
Fig. 9 is a view in elevation showing the screen or switchboard from which the auxiliary parts of the apparatus are operated.

Across each of these wells, (see Figs. 6 and 7), passes a resistance wire 10 between terminals 19, 20 connected with a separate accumulator and in circuit also with the smoke switches 11 to 18 on the operating arm H. The second set of switches N on this operating arm H works the glow lamps P', P⁸, carried as before by the shell-burst arm K as shown in Figs. 5, 6 and 7. An oil reservoir 23 adjoins the well section of the arm K; it is connected with each well by a passage such as 21, (Figs. 6 and 7), and keeps it supplied with oil, and a wick 22 connects this oil with the wire 10; when, therefore, the wire 10 is rendered incandescent, the oil in the wick 22 is burnt and produces smoke, which is immediately passed through the canvas covering E of the apparatus and shows on the outside surface as a puff of smoke. The reservoir 23 keeps the wells 1 to 8 replenished with oil. There is a separate set of accumulators for the glow lamps P'—P⁸, connected with the switches N on the operating arm H, and a separate accumulator for smoke production connected with the switches 11 to 18 on the arm H. In this case, therefore, the smoke may be produced as soon as, or as late as, may be desired after the flash of light is given by the light switch N.

In order to get the flash and smoke puff close together, a table R (Figs. 4 and 7) is supported so as to turn with the arm K, thus supporting a considerable extent of canvas E, and preventing harm, or showing the position of the arm K to a pupil if the canvas becomes slack; further, this table carries the ends of the smoke tubes T so as to adjoin holes such as U through which the light from the lamps P⁴ is flashed, and the tubes T being raised slightly above the surface of the table R, make a good contact with the canvas cover E.

26, 27 and 28 show three of the separate cables carrying current to the lamps P¹—P⁸, and 25 is a metal bus-bar connected to each lamp and to the return of the electrical circuit.

For the electrical connection to the resistance wires 10, separate cables, such as 33, carry current to the row of terminals 19 supported by the separate lids 31 of the small wells 1—8, but insulated therefrom; a common return is provided by the reservoir lid 30 and the separate lids 31, which also carry the row of terminals 20, and which make electrical connection with the lid 30 by means of screws such as 32. Both the reservoir lid 30 and the well lids 31 are made air-tight so that, upon formation of the smoke, it must make its exit through the pipes T.

As will be seen from Fig. 5, the light switches N and the smoke switches 11—18 adjoin each other on the rotating arm H, and can be pressed one after the other.

Fig. 8 represents the arrangement used at the operating end of the base board when the invention is used for instructing artillery officers to observe on the ground. In this case, a transparent celluloid disk W is mounted so that it remains stationary (though adjustable) on the base board F, but toward the top of its support, and above the arm H¹; the arm H¹ is rotatable by means of a small handle X, and has a series of colored felt indicators Y mounted to be in contact with the disk W on its under side when in position, and to correspond in position with the glow lamps on the shell-burst arm. The transparent disk W is inscribed with segments of circles indicating (to scale) the ranges from the firing point, and also portions of radii from the firing point indicating degrees, for instance, with zero center line 0° and angular degree lines 1°, 2°, 3°, right or left, as the case may be and segmental range lines as shown in Fig. 8 corresponding to distances, say, of 6,000–6,400 range from the firing point. Similar disks for other ranges are provided. The instructor, since he can see the arm H¹ through the disk W, can turn it to any position within the limits of the disk, and by pressing the lamp switch corresponding to the nearest indicator fixed stationarily in this case, say, on the handle V of the base board, he can show a flash on the map surface at the farther end followed by a smoke puff on pressing the adjoining switch.

Additional elements such as small screens with feet are used in this case to indicate hills, buildings, or the like, on the canvas map, by which the likeness to a shell bursting behind some equivalent feature in actual practice may be attained; in the case of a shell-burst located behind one of these elements, only the smoke switch will be used, since the flash as in practice would not be seen. Corresponding elements or marks may be placed on the disk W on the top side if be desired, so that the instructor knows the relative position of such on the map.

The working of the invention having now been indicated, some specific details are described hereinafter.

Referring to Figs. 1 and 2, Q is a magic lantern by which slides representing different areas suitable for projection on the canvas cover E are shown; the picture on the slide—if desired, in color—is projected by reflection from the looking glass Q¹, and the slide can be rotated within the lantern Q by means of the finger disk 46 rotating the bevel pair, 47, 48 the latter of which turns the slide holder 49, (see Fig. 12). North and south positions of the area can thus readily be varied on the canvas E in order that the aviator may see the area under observation from changed positions with reference to the north-south line, as he does in practice. The slides may preferably be made from actual aeroplane photographs of different parts of the line.

Referring to Figs. 1, 2, 9 and 10, c represents a screen carried by legs $c^3$ having feet which either support it loosely on the board F, or which may be fixed thereto. This screen $c$, which has wings $c^1$, $c^2$, hinged to it, is also used as a switchboard (see Fig. 9) and it is provided with a table $h$ rotating in bearings so that letters or other signs kept in the partitions $i$ may be placed on the table behind the screen and brought around to the front of the screen into a position where they may be observed from above; the rotating table $h$ is recessed within a front table $e$, which represents a ground station. The screen $c$ also carries a lamp $j$, a battery $k$, and a switch key $m$ in communication with a key adjacent to the observer; by this means, signals may be communicated from the observer to the instructor, say, by the Morse code, the key of the observer being silenced by some suitable device, say, by a rubber pad covered with metal gauze, so that the lamp current may be operated without the observer hearing any sound, as is the case when he signals by means of wireless from an aeroplane, in which the noise of the engine prevents him hearing any other sound.

Tubes $o$ with lamps are provided, on either or both sides of the ground station table $e$ and connect with a set of switches $q$, which in turn are connected with a source of smoke such as the smoke reservoir S of Fig. 1, or the electrical smoke producer 10—22 of Fig. 7, and the battery O in the same way as the tubes $p$, one of the switches of a pair operating the lamp and the other operating the smoke release; when operated from the reservoir S of Fig. 1, a cable $r$ and tube $t$ are carried from the main electric conductor $w$ and smoke tubes $x$ to the screen $c$. In addition to the table signs and the gun lamps shown in Fig. 2, on the table $e$, a box 40, to represent a second ground station, (as shown enlarged in Fig. 10) is placed, so as to be behind the observer; this box is provided with a series of signs, such as W, △, etc., each of which is covered by a lid, such as 41, connected by electrical means with a battery and controlled from the multiple switch 42 so that any particular lid or lids may be raised by the instructor in order to exhibit the under-lying sign or letter to the observer; the switch 42 will have a contact for each sign of those shown in Fig. 10.

This second ground station is intended to indicate that, say at the aerodrome from which the aviator comes, so that he may be signaled to from there independently of the ground station at the gun battery.

Figure 10:
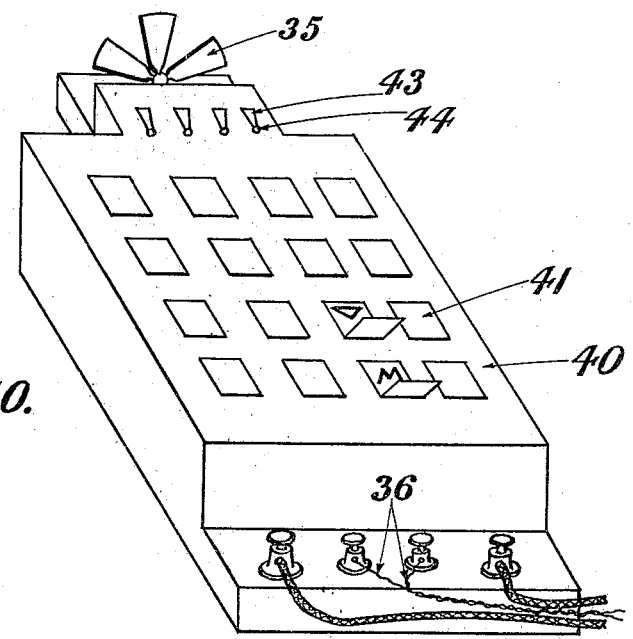
Fig. 10 illustrates a second device for a ground station, say, as is usually the case in practice, that at the aerodrome from which the aviator comes, as distinct from the gun battery.

In place of the tubes $o$ representing guns, four slots, such as 43,—preferably of a conical character to represent the spread of a gun flame—are also provided on the box 40 illuminated from underneath and controlled by the switches on the switchboard $z$, of which the upper line causes the illumination of the lamps and the other line controls the emission of smoke from the smoke holes such as 44, indicated in Fig. 10. The observer thus sees the guns in proximity to a ground station, as he would in practice, and either the table $e$, or the box 40 can thus be used as a ground station for the battery.

In order to represent the smoke under conditions similar to those encountered on active service, a fan 35 is provided—conveniently in conjunction with the ground station box 40—which fan, being rotated electrically by connections 36 to a battery, causes smoke to proceed in one direction in the same way as wind does in practice, the fan being arranged at such a level as to deliver a current of air across the surface of the canvas E.

Referring to Fig. 11, 38 is a special base board, which may be spoken of as the "contact patrol" base board, for use in teaching the observer how to signal a line of contiguous points, for instance, a line of trench 39 reached by a body of infantry after an advance. A series of slides 45 are operated by the instructor until they come under the line of trenches which he wishes the pupil to indicate and which he exhibits to the pupil by means of lamps—preferably colored—contained one in each slide 45, and the pupil has to indicate the position of the forward ends of the slides 45 indicated by this row of lamps by reference to the squares normally forming the background of an artillery map which both instructor and observer have. A portion of such a map is shown under the projecting end of the board 38 for convenience of description and so that the instructor may check the signals given to him by his pupil by comparing them with the squared portion of map under his slides. For instance, if the observer pupil estimates the position of the trench 39 as across the square 16 on his map, he can indicate the line of irregular points due to the displaced ends of the slides 45 by means of sub-divisions of the square 16—S. N, S, as shown on the squares, are merely to indicate the north-south line of the map.

By reason of the canvas E being a flat surface, much better representation of the appearance of the country viewed as from the air may be obtained than the usual model made with earth, and having its hills, valleys, woods and the like, differing from their proper proportionate heights.

In this invention, the instructor can give an accurate representation of the flashes of a hostile battery in action on any point shown on the fabric, or a target may be selected, which will be at any point, such as a trench, a junction, cross roads, a farm, and so on; by such means the instructor is enabled to produce a representation of a shell-burst at any point, at any time, and in any number, and he can do this after such an interval with reference to the Morse signals of the observer, as would normally happen in actual practice.

Before each shoot, the clock code card M (Figs. 1, 2, or Figs. 4, 5) is "oriented" that is, its XII—VI. line is placed parallel to the north and south line on the map, but it must be understood that the whole picture E and revolving frame D may be moved by the instructor as he walks around the platform A, and he can thus produce an impression to the pupil of an aeroplane moving in circles in the air.

As an alternative method of producing smoke, a chemical method may be employed, two substances, for example, hydrochloric acid and ammonia, being mixed, so as to produce a smoky vapor owing to their chemical combination.

The complete apparatus constitutes a very efficient reproduction of the conditions under which an observer in an aeroplane works in actual practice, the alteration of view point due to the movement of the aeroplane being obtained in this invention by movements of the model, while the observer pupil remains seated on his ladder overlooking the model.

While I have shown and described various specific constructions and arrangements as operative embodiments of the principles of my invention, I wish it to be understood that I do not desire to be limited or restricted thereto.

Having thus described the nature and objects of my invention, what I claim as new and desire to secure by Letters Patent, is:—

1. In a device of the character described, a raised frame having a perforated or semi-perforated fabric mounted thereon, a picture with natural features depicted on the said fabric, a movable member thereunder, a series of lamps at one end of said member, and means on the movable member at the other end for actuating the lighting of said series of lamps, whereby a flash may be shown through the fabric at any point chosen by the operator with regard to a target as to which he is instructing an observer located above the picture.

2. In a device of the character described, the combination with a raised frame having a translucent fabric mounted thereon, a picture with natural features depicted on the said fabric, a movable member thereunder, a series of lamps at one end of said member, means on the movable member at the other end for controlling the lighting of said series of lamps, means for producing smoke under some pressure, means for conveying the said smoke to a series of openings adjacent to the said lamps, and means at the operating end of the movable member for releasing the said smoke from a particular opening desired.

3. In a device of the character described, the combination with a raised frame having a solid base and having a translucent fabric mounted at the top of the frame, a picture with natural features depicted on the said fabric, a pivot connection of the said frame to its support, rollers carrying the said frame on its support, a movable base board located on the frame under the fabric, a series of lamps at one end of said base board, means on the base board at the other end actuating the lighting of said series of lamps, means for producing smoke under some pressure and conveying it to a series of openings adjacent to the said lamps, and means at the operating end of the base board for releasing the said smoke from a particular opening desired.

4. In a device of the character described, the combination with a raised frame having a translucent fabric mounted thereon, a magic lantern with a slide having thereon a map or picture with natural features, means for rotating the said slide in the lantern, a mirror above the fabric reflecting the lantern picture on to the fabric, a movable member thereunder, a series of lamps at one end of said member, means on the movable member at the other end actuating the lighting of said series of lamps, means for producing smoke under some pressure and conveying it to a series of openings adjacent to the said lamps, and means at the operating end of the movable member for releasing the said smoke from a particular opening desired.

5. In a device of the character described, the combination with a raised frame having a translucent fabric mounted thereon, a picture with natural features depicted on the said fabric, a movable member thereunder, a rotating shell-burst arm mounted at the forward end of the said base board having a series of electric lamps mounted thereon, a rotating operating arm at the other end of the said base board having a series of switches corresponding to the series of electric lamps, and means for connecting the pivot members of the respective rotating arms so that they rotate in unison.

6. In a device of the character described, a raised frame having a translucent fabric mounted thereon, a picture with natural features depicted on the said fabric, a movable base board thereunder, a rotating shell burst arm mounted at the forward end of the said base board having a series of electric lamps and a series of openings adjacent to the said lamps connected with a source of smoke supply, a rotating operating arm at the other end of the base board having a series of switches corresponding to the lamps on the forward arm and a series of smoke controlling keys connected with the smoke openings on the forward arm, and means for rotating the said arms in unison.

7. In a device of the character described, the combination with a raised frame having a translucent fabric mounted thereon, a picture with natural features depicted on the said fabric, a movable member thereunder, arms rotating in unison at the forward and outside ends of the said movable member respectively, a series of electric lamps and a series of electrically operated smoke generators on the forward arm, a series of electric lamp switches and electrical smoke generator switches on the outside arm, a source of electricity in circuit with the lamp system, and a source of electricity in circuit with the smoke generating system.

8. In a device of the character described, a raised frame having a transparent fabric mounted thereon, a picture with natural features depicted on the said fabric, a movable base board thereunder, a rotating shell-burst arm mounted at the forward end of the said base board having a series of electric lamps thereon, a series of independent wells and a reservoir well therein with passages connecting it to the independent wells, oil in the said wells, an electrical resistance wire supported above the oil in each of the independent wells, a wick connecting the said wire with the oil, a lid and tube to each independent well with the outer end of the tube opening adjacent to an electric lamp, a rotating operating arm on the outside end of the base board, a series of electric lamp switches thereon, a series of electric smoke producing switches thereon, a source of electricity in circuit with the electric lamps and their switches, a source of electricity in circuit with the resistance wire and the smoke producing switches, and means for causing the rotation of the operating arm and the shell-burst arm in unison.

9. In a device of the character described, a raised frame having a translucent fabric thereon, a picture with natural features depicted on the said fabric, a movable member thereunder, arms rotating in unison on the forward end and the outside end of the movable member respectively, a plate marked with a clock face adjustably supported beneath the outside rotating arm, a series of electric lamps disposed on the forward rotating arm to a scale corresponding to a predetermined clock face code, a series of switches on the outside arm corresponding to the series of lamps on the forward arm, and a source of electricity in circuit with the said lamp system.

10. In a device of the character described, a raised frame having a translucent fabric thereon, a picture with natural features depicted on the said fabric, a movable member thereunder, arms rotating in unison on the forward end and the outside end of the movable member respectively, a plate marked with a clock face adjustably supported beneath the outside rotating arm, a series of electric lamps and a series of smoke openings disposed on the forward rotating arm to a scale corresponding to a predetermined clock face code, a series of lamp switches and a series of smoke control switches on the outside arm corresponding to the series of lamps and smoke openings respectively on the forward arm, a source of electricity in circuit with the lamp system, and a source of smoke production in connection with the smoke openings.

11. In a device of the character described, the combination with a raised frame having a translucent fabric mounted thereon, a picture with natural features depicted on the said fabric, a movable member thereunder, arms rotating in unison on the forward end and the outside end of the movable member respectively, a transparent disk mounted stationarily immediately above the rotating (indicator) arm at the outside end and inscribed with range circles and angular degree lines to a predetermined scale emanating from a predetermined firing point, a series of indicators mounted on the indicator arm in contact with the transparent disk, a series of electric lamps disposed on the forward rotating arm to correspond with the indicators on the indicator arm, a series of lamp switches disposed on a stationary support on the movable member, and a source of electricity in circuit with the lamp system.

12. In a device of the character described, the combination with a raised frame having a translucent fabric mounted thereon, a picture with natural features depicted on the said fabric, a movable member thereunder, arms rotating in unison on the forward end and the outside end of the movable member respectively, a transparent disk mounted stationarily immediately above the rotating (indicator) arm at the outside end and inscribed with range circles and angular degree lines to a predetermined scale emanating from a predetermined firing point, a series of indicators mounted on the indicator arm in contact with the transparent disk, a series of electric lamps and smoke openings on the forward arm corresponding to the indicators on the indicator arm, a series of lamp switches and corresponding smoke control switches on a stationary support on the movable member, a source of electricity in circuit with the lamp system, and a source of smoke production in connection with the smoke openings on the forward rotating arm.

13. In a device of the character described, the combination with a raised frame having a translucent fabric mounted thereon, a picture with natural features depicted on the said fabric, a movable member thereunder, a series of lamps at one end of said member, means on the movable member at the other end controlling the lighting of said series of lamps, a screen mounted on the said base board, a rotatable table carrying letters from the back to the front of the screen for the purpose of representing a ground station, an electric lamp or lamps supported in front of the screen, smoke openings adjacent to the said lamp or lamps, lamp switches and smoke control switches on the screen in connection with the said lamps and smoke openings respectively, a source of electricity in circuit with the lamp system and a source of smoke production in connection with the smoke openings and smoke control switches.

14. In a device of the character described, the combination with a raised frame having a translucent fabric mounted thereon, a picture with natural features depicted on the said fabric, a movable member thereunder, a series of lamps at one end of said member, means on the movable member at the other end controlling the lighting of said series of lamps, a box having a series of lid covered signs on its surface representing a ground station and a series of lamps and smoke openings representing guns, a rotary switch with a series of contacts in connection with the sign lids on the said box surface, a series of lamp and smoke control switches in connection with lamps and smoke openings on the box surface, a source of electricity in circuit with the lamp system and a source of smoke production in connection with the smoke openings.

15. In a device of the character described, the combination with a raised frame having a translucent fabric mounted thereon, a picture with natural features depicted on the said fabric, a movable member thereunder, a series of lamps at one end of said member, means on the movable member at the other end controlling the lighting of said series of lamps, means for producing smoke under some pressure, means for conveying the said smoke to a series of openings adjacent to the said lamps, means at the operating end of the movable member for releasing the said smoke from a particular opening desired, and a fan rotating so as to create a draft across the surface of the translucent fabric, substantially as and for the purpose set forth.

16. In a device of the character described, the combination with a raised frame having a translucent fabric mounted thereon, a picture with natural features depicted on the said fabric, a base board, a series of slides independently reciprocable in the base board, lamps on the forward end of each slide, by which contiguous points representing contact patrol positions may be indicated, a lamp switch at the outside end of each slide, and a source of electricity in circuit with the lamp system.

17. In a device of the character described, the combination of a raised frame having a translucent fabric mounted thereon, a picture with natural features depicted on the said fabric, a movable base board thereunder, a rotating shell-burst arm mounted at the forward end of the said base board having a series of electric lamps and a series of openings adjacent to the said lamps connected to a source of smoke supply, a rotating operating arm at the other end of the base board having a series of switches corresponding to the lamps on the forward arm and a series of smoke controlling keys connected with the smoke openings on the forward arm, means for rotating the said arms in unison, electrical smoke generators in connection with the smoke openings on the forward arm, a series of smoke controlling switches on the operating arm in circuit with the electrical smoke generators, a plate marked with a clock face, a screen supported on the base board, a rotatable table representing a ground station mounted on the said screen, a box with lid covered signs located near the translucent fabric, lamps and smoke openings in connection with the screen table and the box with lid covered signs respectively, a fan mounted on the said box, a lamp and Morse key on the said screen in electrical connection with a switch key on a platform occupied by an observer pupil, sources of electricity in connection with the several electric systems, and controlling switches for the several sources of electricity.

In testimony whereof I affix my signature.

RICHARD FITZ POWER.